United States Patent [19]
Felder et al.

[11] Patent Number: 5,983,716
[45] Date of Patent: Nov. 16, 1999

[54] METHOD AND MEASURING DEVICE FOR MEASURING HYDROSTATIC PRESSURE, IN PARTICULAR THAT OF GROUND WATER

[75] Inventors: Anton Felder, Kempten; Heinrich Baur, Altusried; Jürgen Mainka, Wiggensbach; Peter Fend, Haldenwang; Franz Schick, Memmingen, all of Germany

[73] Assignee: OTT Messtechnik GmbH & Co. KG, Kempton, Germany

[21] Appl. No.: 09/043,717

[22] PCT Filed: Aug. 7, 1996

[86] PCT No.: PCT/EP96/03498

§ 371 Date: Mar. 24, 1998

§ 102(e) Date: Mar. 24, 1998

[87] PCT Pub. No.: WO97/13124

PCT Pub. Date: Oct. 4, 1997

[30] Foreign Application Priority Data

Oct. 5, 1995 [DE] Germany .......................... 195 37 149

[51] Int. Cl.$^6$ ....................................................... G01F 23/14
[52] U.S. Cl. .......................................... 73/302; 73/152.27
[58] Field of Search ....................... 73/301, 302, 152.27, 73/152.28

[56] References Cited

U.S. PATENT DOCUMENTS 1,692,163  11/1928  Farman ..................................... 73/302

*Primary Examiner*—Joseph L. Felber
*Attorney, Agent, or Firm*—George W. Dishong

[57] ABSTRACT

The invention covers a procedure for measuring hydrostatic pressure, especially that of ground water, with the particularity that air is bubbled into the ground water, the pressure in the measuring pipe is fed to an absolute pressure cell and atmospheric pressure is then applied to the same measurement cell.

14 Claims, 3 Drawing Sheets

1

METHOD AND MEASURING DEVICE FOR MEASURING HYDROSTATIC PRESSURE, IN PARTICULAR THAT OF GROUND WATER

FIELD OF THE INVENTION

The invention covers a procedure for measuring hydrostatic pressure, especially that of ground water.

The invention also includes a ground water measuring device with a data collector, a measured data recorder and an active link between the measured data recorder and the data collector.

BACKGROUND OF THE INVENTION

A very important aspect of hydrological measurement practice is continuous monitoring of the water table, since this is needed for resolving environmental problems caused by manmade developments.

Water occurs naturally in the form of surface water and ground water. In the surface water category are rivers, streams, lakes and oceans. The water level of surface water is normally easily accessible which makes installation of equipment for measuring and recording this level relatively easy.

By contrast boreholes have to be sunk in order to monitor ground water feeds, and these are normally constructed using 2" to 6" pipes. These pipes are normally capped to prevent unauthorised access.

The requirements of a ground water measuring system are very exacting because of local environmental conditions and specifications imposed by measurement network operators. Some of these requirements are listed below.

Total installation inside 2" to 6" pipes

Operating temperature −20° C. to ±60° C.

Resistance to water condensate

Stable long-term measurement accuracy of +1 cm over 10 m measurement run

Independent power supply for at least 1 year

Low acquisition costs

Low operating costs

Nowadays a large number of measurement systems are available for measuring water levels. But in the light of the overall requirements outlined above not all measurement procedures are suitable for measuring ground water in conjunction with electronic data collectors.

Measurement procedures so far invented can basically be placed in two categories, those measuring length and those measuring pressure. Those measuring length include all measurement systems operated by means of floats with angle encoders, acoustical and optical procedures and measurement using conductivity levels. Those measuring pressure include all systems such as pneumatic pressure recording (introduction of air bubbles) and electronic pressure measurement (piezo resistant, capacitative etc.)

For the purposes of ground water measurement the only systems to have proven themselves in practice are measurement of length by means of floats with angle encoders and electronic pressure measurement. There is a DVWK paper, Issue 107: Ground Water Measurement Devices, Bonn, 1994 which provides a current overview of the use of ground water measurement systems.

SUMMARY OF THE INVENTION

Based on a process for measuring hydrostatic pressure, particularly of ground water, as described at the outset of this document, the task performed as the basis of this invention is to implement such a process in a container with a very small diameter compared with general technological standards, and to do so in a manner which is resistant to water condensate, saves a great deal of power, works independently and costs very little to actually produce measurements.

The ground water measurement device outlined above has to operate at the lowest possible diameter independently of any source of energy which is not part of the system and must be designed to resist water condensate and to be energy efficient, whilst being located in a small-diameter pipe, for example 2 inches.

The surprising way of achieving this with the present process is for air to be bubbled into the ground water with the measurement pipe pressure being relayed to an absolute pressure cell and with atmospheric pressure then being applied to the same measuring cell.

This is achieved with the deployment of a ground water measurement device of the above type with a data collector, measured data recorder and an active link between measured data recorder and data collector by means of a piston-driven pump which bubbles air into the water together with an integrated valve function to open and close the measurement pipe while simultaneously controlling pressure in the measurement pipe and atmospheric pressure.

It has not been overlooked that the process of bubbling air into water has been used highly successfully for the measurement of water levels in surface waters. For this the outlet end of an air feeder pipe or tube is fed to a point just below the lowest water level to be measured. Air is fed through the pipe continuously (pressure reducer, quantity controller) to ensure that air bubbles come out of the outlet end of the air feeder pipe. In this way air pressure at the outlet end of the feeder pipe is the same as the pressure of the liquid at this point. Taking the density of the water one is left with a linear connection between the desired water level reading and air pressure in the pipe. Air pressure in the measurement pipe is measured outside the water using a compensation process (sprung bellows, sliding weight) or a reference pressure measurement cell. Recording of the water level is by means of a mechanical marking device or a data collector. A description of this measurement system can be found in the company brochure issued by Messrs Ott Measurement Technology GmbH & Co KG, Ludwigstrasse 16, 87437 Kempten, Compact Pneumatic Level Device R25, 20.502.000.P.D.

In addition measurement systems using the introduction of air bubbles are known through patent descriptions DL-PS 7733 - IPC G 01 c, German Offenlegungsschrift to Rhieische Braunkohlenwerke, P 22 48 315.4-52 and Eastern German (DDR) patent specification WP G 01 F / 198 683 leading to German Patent Number 132278, issued Sep. 13, 1978. However none of these air-fed measurement systems are housed completely in a 2" diameter level-detecting tube, nor can they be operated for a whole year using their own independent power supply (6V, 1.5 Ah). Further distinguishing features are that they all require a continuous feed of air and therefore have to be supplied from a volume of air in a spare tank, involving a considerable requirement for space and/or energy resources.

The considerable quantity of apparatus required on the surface has hitherto ruled out application of the air bubble feeder process to ground water measurement technology, and this has been reinforced by the professional view that continuous energy supply from an outside source was necessary over long periods.

The task outlined above was surprisingly simple to resolve using a combination of a compressor integral to the system (piston-driven pump) and determination of the measurement cell as an absolute pressure cell.

It is particularly appropriate given the small amount of energy available that air does not have to be fed in continuously, but at say fifteen minute intervals.

A particularly appropriate design feature is the small diameter measurement pipe which allows air to blow out into a large volume compared with the size of pipe.

In terms of the equipment fitted the diameter of the air feeder vessel can for example be 20 times as great as the diameter of the measurement pipe itself. This ensures that measurement error can be restricted to a very small degree as the water level rises. This principle derives from a simple physical law according to Boyle-Mariotte, namely: "the product of pressure and volume is constant for an enclosed gas at constant temperature". The piston-driven pump used does not have any connecting links. The piston rod simply operates in a straight line. The piston has a tappet which instantly opens a valve in a certain position, namely the position of maximum pressure. The resulting loss of pressure firstly rapidly cleans the measurement pipe and the air feeder vessel of any remaining water. It also ensures that any condensate residues and any algae that may be present at the air outlet apertures are blown away.

The design allows the pressure drop extremity to be used as a trigger for the motor, say a DC motor, to be reversed and operated the other way.

Conical valves have shown themselves to be particularly appropriate. However the tappet can also be used for the instant dislodging of a cup from its valve seating. The counter-pressure spring is designed only to cut in over the Hook scale. It is tared and is triggered at a pressure of say 2 bar, at which the tappet of the piston hits the valve.

Data collector, piston-driven pump, absolute pressure cell, optical interface can all be inserted along with the power source (battery) into a two-inch pipe and lowered beneath the well cap into a frost-free area. This houses the whole assembly in frost-free ambient conditions. The great advantage of this is that extreme temperatures do not influence the measurement system (which consists of electronic and mechanical devices) in any way.

Unlike other equipment there is in this case no continuous supply of air, which saves on electricity. Since, however, as the water table rises (between measurements) air in the outlet feeder vessel and in the pipe is compressed, the barrier between water and air is displaced. What this means is that as the water table rises, water enters the outlet feeder vessel. The pressure measured thus no longer relates to the air feeder outlets but to the water table level in the outlet feeder vessel. In existing equipment this source of error is remedied by an adequately high continuous supply of air. But power consumption by such equipment is too high as it pumps the requisite quantity of air through the system in order to be able to meet the above requirement, an aspect which the present invention surprisingly solves by means of the volume and/or diameter ratios applied.

Overall the invention covers application of the introduction of air bubbles, a technique which is already well-known in the measurement of surface water, to the measurement of ground water levels, replacing the standard compressor with a connection-free piston-driven pump with a tappet fitted to the piston to operate a valve and with pressure being measured via a source of absolute pressure.

The features of this invention mean that if it is used to measure hydrostatic water pressure by means of measurement pipes sunk into the ground water:

the principle of the introduction of air bubbles can be applied;

a two inch pipe can be used to house the equipment;

reliable operation is assured at outside temperatures of −20° C. to +60° C.;

resistance to water condensate is assured;

stable long-term measurement accuracy is guaranteed of +/−1 cm over 10 m;

a self-contained power supply is provided for at least 1 year, something which has been inconceivable for other existing systems;

compared with other existing systems, the procurement cost of this equipment is up to 50% lower, and operating costs are low.

A simple raising and lowering cable can be used to bring up the mechanical and electronic devices. The way that the outlet feeder vessel is deployed, as described in more detail below, means that it can stay in place.

As described below, measurement accuracy is not affected even if there is zero point drift in the absolute pressure measurement cell.

Design features of this invention allow a lockable cap to be fitted, which can be locked and thus allow the device to be deployed in municipal areas without any risk of contamination, for example through accidental oil spillages.

There follows a more detailed description of one possible implementation of the invention, to be read in conjunction with the enclosed drawings, in which:

DETAILED DESCRIPTION OF THE INVENTION

Figure 1:
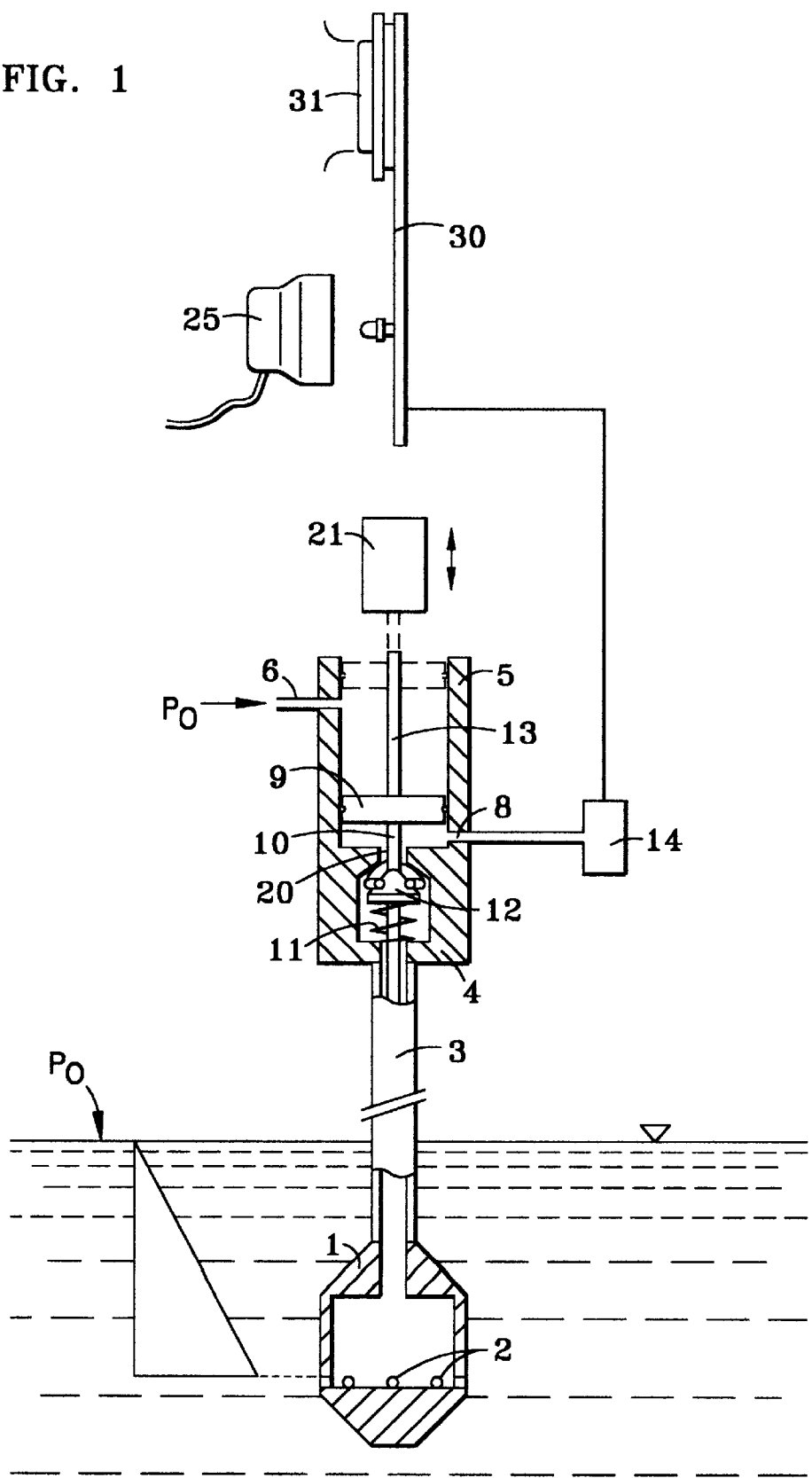
FIG. 1 shows a schematic view of a system using the introduction of air bubbles to measure ground water levels as per this invention.

FIG. 1 shows the outlet feeder vessel 1 located below the lowest water level to be measured. Outlet apertures 2 are located all over the outlet feeder vessel 1 at regular intervals. The outlet feeder vessel 1 is itself linked via a measurement pipe 3 to a piston-driven pump 4.

It is important that the cross-sectional surface area of the outlet feeder vessel 1 is many times greater than the cross-sectional surface area of the measurement pipe 3. The ratio [R] between outlet feeder vessel cross-sectional surface area and measurement pipe cross-sectional surface area should, for example, exceed 400.

The piston-driven pump 4 consists of a piston 9, to which a rod 10 is attached and a cylinder sleeve 5, in which are located two boreholes 6 and 8. At the lower end of the piston 4 there is a valve-type mechanism, consisting of a return spring 11 and a cut-off cone 12. The piston 9 moves up and down on a piston rod 13 having trapezoidal thread thereon, linked to an electric motor 21.

When the piston is fully in the 'up' position air enters via borehole 6 into the cylinder block. Pressure inside the cylinder equates exactly with atmospheric pressure. Atmospheric pressure is then measured in this in this position using an absolute pressure measurement cell 14. This absolute pressure measurement cell is connected to borehole 8 and is thus in contact with the atmospheric pressure in the cylinder block.

If the piston 9 is now driven down the enclosed air in the cylinder block is compressed to around 2 bar for example. Once a pressure of around 2 bar has been reached the rod 10 presses down on the cut-off cone 12 and opens the outlet 20. Air rushes into the measurement pipe 3. The pumping action is repeated until any water which has entered the outlet feeder vessel 1 has been forced out. This sudden blast of air in measurement pipe 3 has the additional great advantage of forcing out any water droplets present in measurement pipe 3.

The measured pressure drop, as measured between (from the piston lowest position) the maximum piston pressure and the value of the atmospheric pressure (the piston upmost position) is used for controlling the reversal moment of piston 9.

The time taken by the piston 9 to travel depends on the difference in water level (rise) and the desired measurement interval.

The piston 9 is in its bottom position when pressure in the measurement pipe is measured. Pressure in the measurement pipe 3 is thus relayed to the absolute pressure measurement cell 14.

Measurement of pressure in the measurement pipe and measurement of atmospheric pressure are required, since an absolute pressure measurement detector does not provide for any automatic compensation of atmospheric pressure. The electronic devices used for collection and evaluation of data are used to calculate hydrostatic water pressure.

The chosen configuration, a piston-driven pump with a valve outlet in conjunction with an absolute pressure measurement cell guarantees highly accurate and stable long-term measurement. The configuration is not in any way affected by moisture. A further advantage of the chosen configuration is that even if there is zero point drift of the absolute pressure measurement cell, measurement accuracy is not adversely affected as a result.

Figure 2:
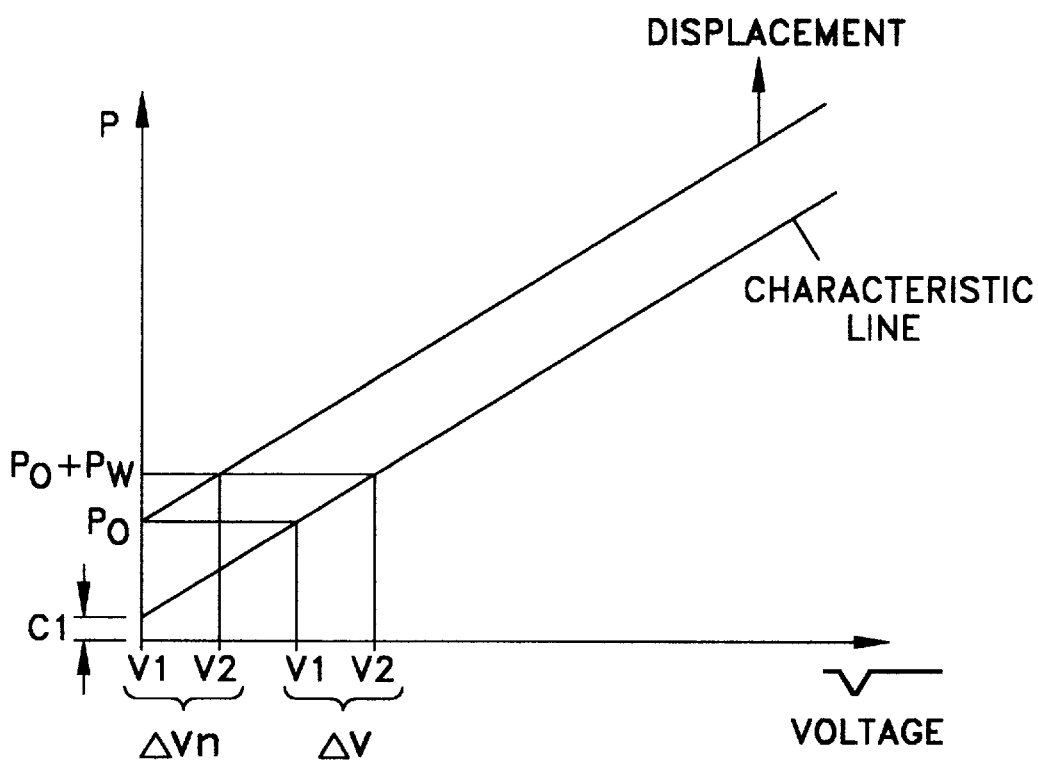
FIG. 2 is a diagram which makes clear the degree of measurement accuracy.

FIG. 2 shows what happens in practice. The characteristic line of a pressure measurement cell is in relation to the desired measurement reading (input reading) and the output signal received. This characteristic line is in the form of $y=a+bx$. When measuring with the help of this configuration po and po+pw are measured. Calculation of hydrostatic water pressure is then performed using the change of volume delta V, $\Delta V=V2-V1$. If the characteristic line is now displaced (displacement of the zero point) the measurement is not adversely affected as a result. The [/ \] $V=V21-V1$ remains the same.

The pressure measured by pressure detectors is the product of the height of the water column and the density of the water plus the atmospheric pressure exerted on the water. In order to exclude the influence of the air pressure pressure detectors with differential pressure measurement are used in well-known and established equipment. To achieve this, atmospheric pressure is fed via a thin tube to the reverse side of the detector membrane. Moisture which has condensed into droplets inside this tube can hinder the passage of air and thus lead to incorrect measurements.

The readings measured (pressure in the measurement pipe and atmospheric pressure) are relayed to an electronic collection and evaluation device 30. This electronic collection and evaluation device 30 has a display 31 for displaying measurements taken at the site. There is an optical interface (infrared) 25 also connected to the electronic collection and evaluation device which allows data which has been collected to be read out as necessary from the electronic collection and evaluation device storage unit.

Figure 3:
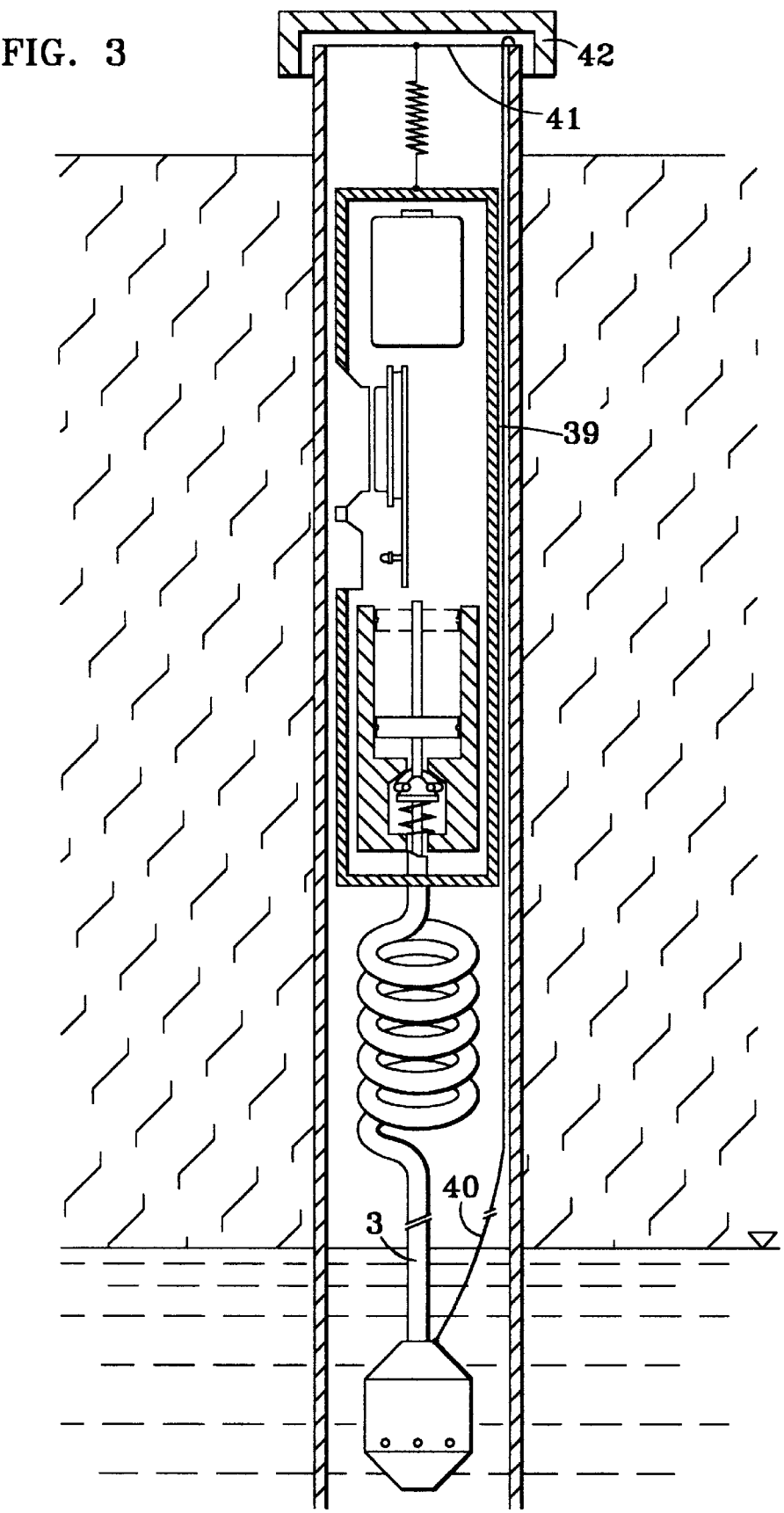
FIG. 3 shows a schematic view of one possible implementation of the invention, depicted while taking measurements in a ground water measurement pipe.

FIG. 3 illustrates additional advantages of measurement system 39. For a readout or to change the battery the measurement system has to be removed from the pipe. When this is done the position of the outlet feeder vessel 1 must not be altered. This is achieved by securing the outlet feeder vessel 1 to a thin wire 40 which is attached running upwards to a special securing device 41 beneath the lockable cap 42. Since the measurement system 39 is also connected to the outlet feeder vessel 1 via the measurement pipe 3, the upper section of the measurement tube is in the form of a spiral. This means that when the measurement system is taken out, the measurement pipe 3 can stretch for several meters without altering the position of the outlet feeder vessel 1.

The measurement system itself is also connected to the securing device 41 by means of an elastic cable. This elastic cable prevents any damage occurring to the measurement system from downwards pull.

We claim:

1. A device for measuring of hydrostatic pressure of a fluid, comprising: a data collector;

a measured data recorder in data communication with said data collector through an active link between said measured data recorder and said data collector;

a piston pump, said piston pump having an up-most and a lower-most position within a cylinder cavity defined by a cylinder sleeve;

two boreholes, one of said two boreholes being positioned to communicate with atmosphere air and said cylinder cavity when said piston pump is in said up-most position, another of said two boreholes being positioned at a lower region of said cylinder cavity and to communicate pressure measure of air within said cylinder cavity with a pressure measuring cell, said pressure measuring cell in data communication with said data collector;

an integrated cut-off cone valve, functioning to open and close an outlet of said cylinder cavity which outlet is in connection with a measurement pipe, said integrated cut-off cone valve providing communication between said cylinder cavity and said measurement pipe when said piston pump is moving from said up-most position toward said lower-most position and said integrated cut-off cone valve opens when said pressure of air within said cylinder cavity is at least greater than a predetermined pressure value and greater than said pressure in said measurement pipe, said pressurized air flowing from said cylinder cavity through said measurement pipe; and an outlet feeder vessel in pressure flow communication with said measurement pipe, said pressure measuring cell thereby measuring said hydrostatic pressure of said fluid within which is located said outlet feeder vessel and said pressurized air flowing from said measurement pipe into said outlet feeder vessel and bubbling out of said outlet feeder vessel through a plurality of outlet apertures into said fluid.

2. The device for measuring of hydrostatic pressure of a fluid according to claim 1 characterized in that connections for said atmosphere air and said pressure measuring cell run within said cylinder cavity of said piston pump.

3. The device for measuring of hydrostatic pressure of a fluid according to claim 2 further comprising an optical interface connected to said data collector, characterized in that the data collector, the piston pump, the pressure measuring cell and the optical interface are located inside a two inch pipe.

4. The device for measuring of hydrostatic pressure of a fluid according to claim 3 characterized in that said optical interface is in particular an infrared interface.

5. The device for measuring of hydrostatic pressure of a fluid according to claim 4 characterized in that said measurement pipe is a coiled flexible pipe and further comprising a tension cable connected to said outlet feeder vessel.

6. The device for measuring of hydrostatic pressure of a fluid according to claim 3 characterized in that said outlet feeder vessel is hung down to a level, which is below the lowest water level anticipated.

7. The device for measuring of hydrostatic pressure of a fluid according to claim 1 further comprising an optical interface connected to said data collector, characterized in that the data collector, the piston pump, the pressure measuring cell and the optical interface are located inside a two inch pipe.

8. The device for measuring of hydrostatic pressure of a fluid according to claim 7 characterized in that said optical interface is in particular an infrared interface.

9. The device for measuring of hydrostatic pressure of a fluid according to claim 8 characterized in that said measurement pipe is a coiled flexible pipe and further comprising a tension cable connected to said outlet feeder vessel.

10. The device for measuring of hydrostatic pressure of a fluid according to claim 1 characterized in that said outlet feeder vessel is hung down to a level, which is below the lowest water level anticipated.

11. Method for measuring of hydrostatic pressure of ground water, wherein a device for measuring of hydrostatic pressure of a fluid having a data collector, a measured data recorder as well as an active link between the measured data recorder and the data collector, characterized by an externally driven piston pump for blowing air bubbles in with an integrated valve which functions to open and close a measurement pipe and to provide for the measurement of pressure in the measurement pipe and measurement of atmospheric pressure, and an absolute pressure cell being fed by action of the piston pump at first with the measuring line pressure of the ground water measuring device and then with the atmospheric pressure, said method comprising the steps of:

bubbling of air into the ground water;

applying the pressure in the measurement pipe to an absolute pressure measuring cell;

subsequently applying the atmospheric pressure to the same side of the measuring cell through action of said piston pump and said integrated valve operation; and measuring of the hydrostatic pressure of the ground water consequently from the air passed through said integrated valve into said measurement pipe and into an outlet feeder vessel through a plurality of outlet apertures into the ground water and said measurement pipe having a small diameter, said air blowing out into said outlet feeder vessel having a large cross-section area in relation to the cross-sectional area of the measurement pipe.

12. The method for measuring of hydrostatic pressure of ground water according to claim 11 further comprising reversing of the direction of the piston of said piston pump, said reversing of direction happening when said piston is positioned at a maximum pressure position and said reversing caused by a gear effective to cause said reversing.

13. The method for measuring of hydrostatic pressure of ground water according to claim 2, characterized in that the data collector—working according to the bubbling out principle—the piston pump, the absolute pressure measuring cell and an optical interface are all inserted along with a power source into a two inch diameter pipe.

14. The method for measuring of hydrostatic pressure of ground water according to claim 11, characterized in that the data collector—working according to the bubbling out principle—the piston pump, the absolute pressure measuring cell and an optical interface are all inserted along with a power source into a two inch diameter pipe.

* * * * *